United States Patent [19]
Gould

[11] Patent Number: 5,241,611
[45] Date of Patent: Aug. 31, 1993

[54] CABLE JOINT

[75] Inventor: Colin A. Gould, Suffolk, England

[73] Assignee: British Telecommunications public limited company, London, England

[21] Appl. No.: 858,972

[22] PCT Filed: Oct. 4, 1990

[86] PCT No.: PCT/GB90/01517
§ 371 Date: Mar. 20, 1990
§ 102(e) Date: May 20, 1992

[87] PCT Pub. No.: WO91/05283
PCT Pub. Date: Apr. 18, 1991

[30] Foreign Application Priority Data
Oct. 4, 1989 [GB] United Kingdom ............. 8922354

[51] Int. Cl.⁵ .............................................. G02B 6/44
[52] U.S. Cl. .................................. 385/70; 385/71; 385/86; 385/87; 385/99
[58] Field of Search ............... 385/69, 70, 71, 75, 385/86, 87, 99; 174/89, 70 R, 70 S, 71 R, 72 R, 72 A, 72 C

[56] References Cited
U.S. PATENT DOCUMENTS

| | | | |
|---|---|---|---|
| 4,227,770 | 10/1980 | Gunn | 350/96.23 |
| 4,348,076 | 9/1982 | Oldham | 350/96.21 |
| 4,545,645 | 10/1985 | Mignien | 385/69 |
| 4,595,256 | 6/1986 | Guazzo | 385/69 |
| 4,733,935 | 3/1988 | Gandy | 350/96.20 |
| 4,799,760 | 1/1989 | Beatty et al. | 385/69 |
| 5,048,921 | 9/1991 | Jones et al. | 385/69 |

FOREIGN PATENT DOCUMENTS

| | | |
|---|---|---|
| 2401434 | 3/1979 | France . |
| 136505 | 11/1964 | New Zealand . |
| 137643 | 2/1967 | New Zealand . |
| 159285 | 2/1972 | New Zealand . |

*Primary Examiner*—Frank Gonzalez
*Attorney, Agent, or Firm*—Nixon & Vanderhye

[57] ABSTRACT

A cable joint for joining the ends of two optical fibre cables, each having a core of optical fibres (12) and a king wire (14) surrounded by armor wire (17) and an outer sheath (18), comprises an insert (20) between the core and the armor wire of each cable and a protective sleeve (38) swaged directly to the armor wire braced by the insert. The directly engaged sleeve provides a simple, efficient joint. An over-moulded cover (40) seals the joint.

29 Claims, 1 Drawing Sheet

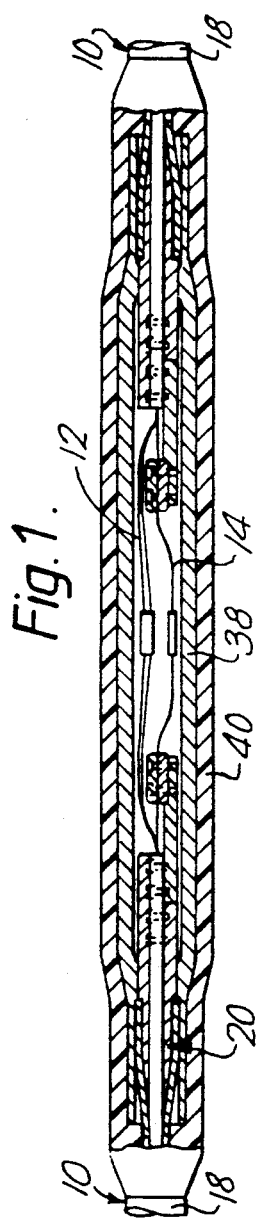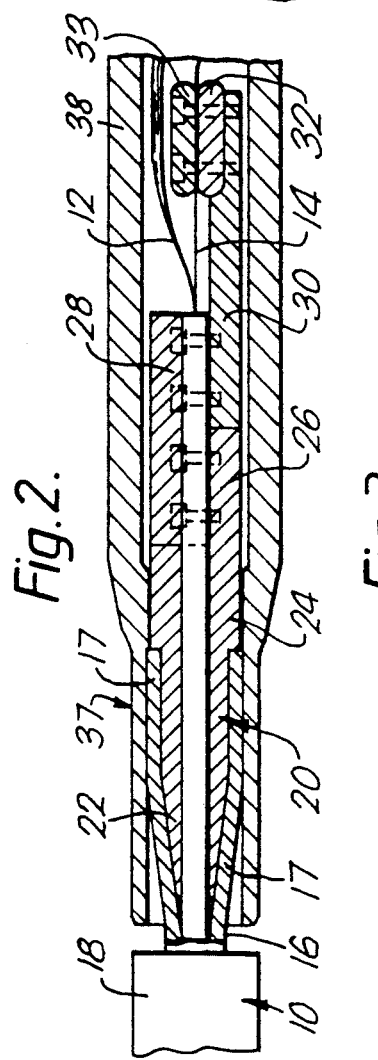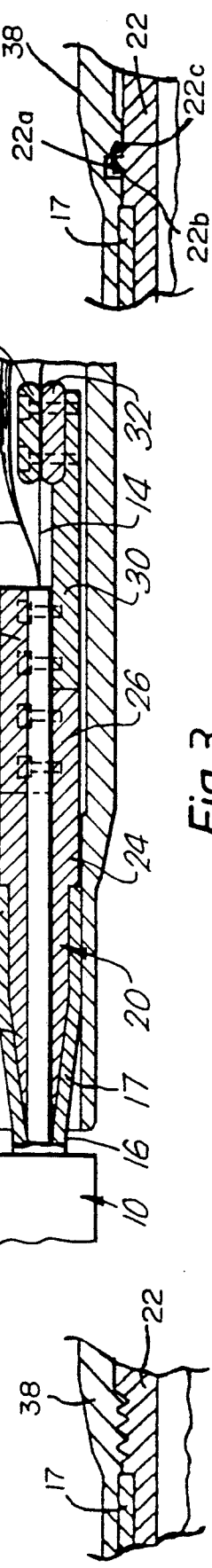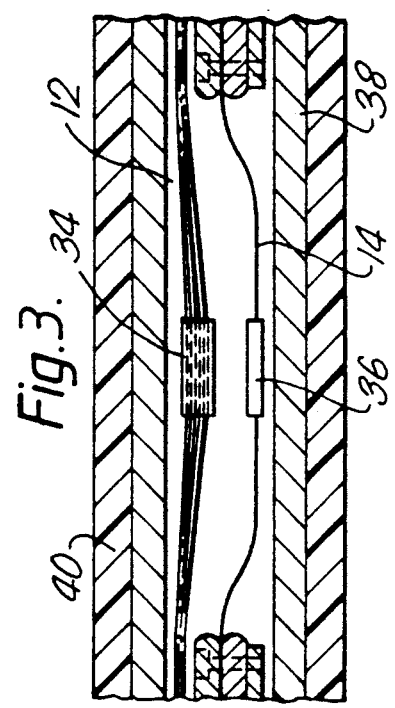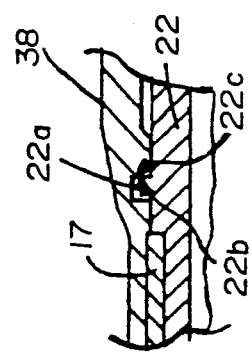

CABLE JOINT

This invention relates to joints for cables. The invention is particularly applicable to a sealed joint for a submarine cable, especially an optical fibrebased cable.

Submarine cables are made up of a series of lengths which are joined before being deployed from a ship. Normally, the lengths are joined in the factory. However, in circumstances of repair, lengths have to be joined onboard ship. In the case of optical fibre telecommunication cables, the quality and repeatability of splicing techniques has improved considerably over recent years such that it is now possible to produce multiple fibre, low loss splices between lengths of cable with a good probability of success at the first attempt.

Previously, however, optical fibre splices were significantly less reliable. Only single splices could be performed at a time. Because the splicing process could not be guaranteed to produce an acceptable splice first time with a sufficiently good probability, it was necessary to allow for a spare meter, or so, of optical fibre in order to account for the likelihood of having to reconnect badly spliced fibres. Thus, each time a splice had to be repeated a few centimeters of fibre had to be cut off the spare length. Not all splices are unsuccessful within the first few attempts. Because of this a joint between two fibres had to allow for the maximum amount of spare fibre not used up in repeating the splicing procedure.

One of the main factors affecting the useful life of an optical fibre is the amount of stress to which it is subjected. Bending a fibre induces stress in it. It is, therefore, necessary to consider this fact in the manner in which the spare fibre at a joint is stowed.

Statistically, a fibre that has passed its quality control standard load test should only be subjected to bends of a minimum diameter of about 60 mm if it is to stand an acceptable chance of functioning properly for a projected minimum 25 year working life. Because of this constraint joints between cables have to accommodate 60 mm diameter loops of spare fibre. The result of this is that a 25 mm diameter cable carrying a group of optical fibres has to balloon out to a 100 to 120 mm diameter joint. The joints constitute a flexural discontinuity in the cable as well as a dimensional one. This can be problematic when the joined cables are deployed using winching gear and are paid out over the side of a ship.

Furthermore, the known joints are complex assemblages requiring portions for transmitting tension between the joined cables, a bobbin on which to wind the spare optical fibre and terminating arrangements for the end of each cable for separating the optical fibres.

It is also the case that the original manufacturer of the cable will need to apply other processes to the joined lengths. Typically, extra external armour wire layers are added. To do this the cable has to pass through an armouring machine which will not accept bulky conventional joints. Thus, armouring has to be split into discrete steps between the joints and additional steps to cover the joints themselves.

In U.S. Pat. No. 4,227,770 there is described a submarine optical fibre cable in which a central strength member is provided with helically cut grooves to receive optical fibres. Steel wires are wound helically around the strength member and fibres with the direction of lay of the wires opposite to that of the grooves. Additionally, there is disclosed a technique for jointing two such cables. A tubular metallic ferrule with an external flange at one end is swaged over the steel wires of a prepared cable end, with the ferrule's flange towards the cable end. Both cable ends are ferruled in this way, the fibres of the cable ends are optically coupled, and the cable ends secured one to the other using a split cylindrical coupling, formed of two similar semi-cylindrical parts, the bore of which is provided with recesses to receive the flanges of the ferrules. The two halves of the cylindrical coupling are held together using either a circumferential band clip or screws which pass through the walls of the coupling.

Among the disadvantages of this coupling technique are the fact that the cylindrical coupling has to be of considerable diameter to accommodate the flanged ferrules, since it is the flanges and the coupling abutment surfaces which transfer the load across the joint. The recesses in the inner wall of the coupling have to be deep to provide a sufficient surface area to carry the massive loads imposed in use on submarine cables, and to this recess depth there has to be added a considerable material thickness about the grooves to ensure that the coupling is sufficiently strong to carry the loads received from the ferrules. The present invention provides a means whereby, for a given strength, the external diameter of the joint can be reduced. In the most preferred embodiment, the number of components in the joint is also reduced.

An advantage of joint assemblies according to the invention is that they can be made with overall widths, typically a diameter, which is similar to the overall width of the cable. This means that during cable manufacture when it is necessary to join two cable ends-as may be the case where a defective portion has been removed, for example, the use of a fully armoured joint is not necessary, simple reinstatement of the insulation, etc., being all that is normally necessary, and hence such joints will normally pass through cable armouring machines without special treatment. This, coupled with the simplicity of joint assemblies according to the invention, can result in significant reductions in plant downtime and the amount of human intervention required, with consequently considerable cost savings.

It is an object of the present invention to provide a simplified joint structure and to reduce the size of a joint between two lengths of cable.

According to the present invention there is provided a cable joint assembly for joining cables which each have an inner core, at least some of the components of which are connected together, and a tensile element surrounding the core, the assembly comprising anchor means secured, in use, to the tensile element at the cable ends, and a sleeve extending between the cable ends, characterised in that the sleeve provides a housing for the core components and the sleeve is secured directly to the tensile element.

The invention is a considerably simpler structure having only two or three main components, namely the anchor means, usually one at each end, and a housing sleeve engaged with the anchor means.

The thinness of the joint allows joined lengths of cable to be passed through an armour wire applying machine or other process without having to perform a separate step to cater for the joint.

The engagement may either be in the form of a slight clearance fit between the sleeve and the anchor means, a threaded engagement or a bayonet-type locking ring and pin arrangement in which the sleeve and anchor means are moved axially relative to one another such that the ring on either one passes the pin and is then rotated such that the pin lies behind the ring to secure the pair together.

In one particular form the anchor means comprise two separate devices anchored to each of the cable ends. These may be in the form of swaged terminations comprising a tapered insert inserted between the core and an outer sheath in swaged engagement with the tensile element.

The sleeve may be a closed rigid tube. In order to seal the assembly the anchor means and sleeve are surrounded by a sealing sleeve which sealingly engages the exposed cable. Preferably this is in the form of a plastics over moulding. In particular a polyethylene over moulding.

The invention also extends to a method of joining two cables using an assembly according to the invention, which method comprises passing a joint sleeve along one cable, terminating the ends of the cables in the anchor means, connecting the core elements, passing the sleeve back over the first termination and engaging the sleeve directly with both anchor means to cover the connected core elements.

Thus, the joint consists of an anchor at each cable end which, together with the sleeve is able to transmit tension, torque and bending from one cable to the other. The assembly is particularly slim. This, in part, is a result of the simplicity of construction of this invention in which the sleeve is engaged directly with the anchor means without the use of any intermediate parts.

The present invention can be put into practice in several ways, one of which will now be described by way of example with reference to the accompanying drawings in which:

FIG. 1 is a section through a joint according to the present invention;

FIG. 2 is an enlarged view of one end of the joint of FIG. 1 with an outer sleeve removed;

FIGS. 2A and 2B illustrate threaded and flanged alternate connections between the sleeve and collar of FIG. 2; and FIG. 3 is an enlarged view of the middle of the joint of FIG. 1.

Referring to the drawings, each of a pair of optical fibre cables 10 to be joined comprises an inner core of a set of six optical fibres 12 surrounding a steel king wire 14 embedded in a thermoplastics elastomer and contained inside a protective and screening copper tube 16. The copper tube 16 is also used to transmit power to repeaters along the lengths of cable. The tube 16 could equally well be made of aluminium steel or any other suitable electrically conductive material.

The tube 16 is surrounded by layers of helically wound armour wires 17 embedded in a polyethylene sheath 18. In general, the cable is a conventional optical fibre cable as will be well known to the person skilled in the art.

The end of each cable 10 is terminated in a hardened steel insert 20. The gently tapered end 22 of the insert is driven into the end of its respective cable 10. The insert 20 has an internal bore which has a diameter sufficient to allow the copper tube to pass down it as the insert is inserted between the tube and the armour wires 17. As the insert is driven further into the cable, the armour wire 17 is splayed radially outwardly.

The portion of the insert 20 extending away from the end 22 is formed as a cylindrical collar 24 defining the radially outer extent of the insert 20. The bore of the collar is co-axial with that in the end 22. The copper tube 16 extends into this bore up to the end of a semi-cylindrical extension 26 of the insert 20.

The exposed bundle of fibres and wire is gripped between a semi-cylindrical extension 30 of the collar 24 and a clamping member 28 screwed onto the extension 26. The extension and clamp define a co-axial extension of the bore extending through the insert. However, this part of the bore is packed out with, for example, a shrink wrap tube over the fibres embedded in their thermoplastics elastomer in order that it is held firmly in place relative to the tube and the rest of the cable.

The clamp 28 extends axially beyond the extension 26 and is secured to the semi-cylindrical extension 30 which is made of an insulating material or possibly metal if no insulation is required for the king wire.

At the end of the clamp 28 the fibres are separated from the king wire, removed from the thermoplastics elastomer and diverted away from the run of the channels. The king wire 14 passes above the channel in line with the axis of the bore and is itself individually clamped between a metal jaw 32 on the insulating extension 30 and a complementary jaw 33 secured to it by bolts. The exposed copper tube 16 is gripped between the semi cylindrical surfaces of the extension 26 and the clamp 28.

To provide a degree of rigity between a pair of inserts, they may be connected. For example, by using a common extension 30 or common metal jaw 33.

The separated fibres 12 and king wire 14 are spliced and joined, respectively, at connections 34 and 36 between the inserts extending from each cable end. By virtue of the insulating extension 30 the king wire is electrically isolated from the insert itself.

The pair of inserts 20 anchored to the cables 10 are each received within a steel ferrule body 37 on each end of a sleeve 38. The sleeve 38 is swaged into secure engagement with the armour wire 17 and the outer surface of the insert between the collar 24 and the insert end 22 by deforming the ferrule body 37. At each of the swaged parts, the sleeve 38 is, thus, clamped directly to the tensile element, which in turn is securely fixed to the insert. Tension in one cable is transmitted through its insert along the rigid sleeve, through the insert on the other cable end and thence down the cable tensile element at that end. The sleeve 38 extends axially past the ends 22 of the insert 20.

In order to seal the assembly, the ferrule sleeve 38 is coated in a polyethylene over-moulding 40. The overmoulding extends over the ferrules sealingly to engage the outer surface of the sheath 18. In this embodiment the sheath is terminated short of the axial extent of the sleeve 38, leaving an exposed portion of armour wire 17. The overmoulding 40 extends over the sleeve, the exposed armour wire and sealingly engages the sheath 18.

Alternatively, the over moulding could be replaced by a preformed sleeve extending over the ferrule sleeve 38 with sealing moulding portions being used at either end to seal the sleeve to the sheath 18.

The ferrule sleeve 38 provides a protective housing for the connected fibres and king wires which is both simple to construct and slim in comparison to the previously known bulbous joint housings. The connections are made in-line contributing to the slimness of the joint with the sleeve providing the engagement with the cable ends. Alternatively, the sleeve could be fixed directly to a separate swaged, or otherwise engaged, anchor.

While a rigid sleeve has been described, this could be replaced with a tube flexible along its axis and yet diametrically rigid to protect the housed fibres.

The procedure for constructing the joint is as follows:

The ferrule sleeve 38 is slid over the end of one of the cables 10 to be joined. With the sleeve 38 slid out of the way, both of the cable ends are terminated with an anchor insert 20 as previously described such that the fibres and king wire to be joined protrude past each insert.

After the fibres and king wires have been joined successfully the sleeve is slid back towards the insert on its cable end. The internal diameter of the neck of the ferrule sleeve 38 is a clearance fit with the external diameter of the collar 24. However, the leading end of the sleeve 38 may have to be forced over the radially expanded armour wire as a result of the inserted insert. The internal diameter of the sleeve between the ends is wider to provide a better clearance fit, to enable the sleeve to be slid more easily along the axis of the cable to be joined, toward the other cable end. Preferably, simultaneously, the collars 24 become positioned in relation to the respective end portions of the sleeve 38. The sleeve ends are then swaged radially inwardly to provide securement to the tensile component braced by the insert.

It is convenient if the cable ends are mounted a prescribed distance apart on a jig when the connecting and/or jointing steps are performed.

Alternatively, the clearance fit between the sleeve and each collar is replaced by a screw thread engagement as shown in FIG. 2A. On the other hand, a particularly quick and secure attachment between the two can be provided by a snaplock collar arrangement in which radially extending pins 22a on the inside of the sleeve or the external surface of the collar are received axially through gaps in a flange or along a groove in the other of the ferrule and collar and then rotated angularly past the flange or along the path of the groove axially to secure the members together by interlocking abutments 22b and 22c as shown in FIG. 2B can conveniently be used to position the sleeve on the spaced inserts for swaging.

Thus, at each end of the joint, the tensile element of the cable, constituted by the armour wire 17 is firmly attached to the insert 20 which also secures the core, and its various components, relative to the tensile element. The tensile element is held between the insert and the swaged sleeve end. The copper tube 16 is clamped between the extension 26 and the clamping member 28. The components inside the tube are clamped between the member 28 and the extension 30. The king wire is clamped between the jaws 32 and 33. Hence, the parts of the cable are all individually clamped by the insert to prevent their movement relative to one another.

Because the sleeve and swaged anchoring parts are one item, the number of component parts required to provide a joint between two cable ends is reduced. This also reduces the time required to make the joint up. Of course, the sleeve portion and the ferrule body portions 37 may not be a unitary construction.

The thinness of the tube means that the amount of polyethylene required to coat it to provide the sealing outer skin is significantly reduced. This also results in a reduction in the time required before the joint is ready for use as the moulding cools down more quickly.

Clearly a further reduction in the cooling time is realised when only the ends of a preformed sleeve have to be moulded to the sheath 18.

It would also be possible to have different diameter collars on each of the inserts to clear the sleeve. In this case, the larger internal diameter of the sleeve at one end, corresponding to the larger of the two collars, will allow it to pass freely over the other of the collars as well as the rest of the insert and armour wires. However, the inserts and sleeve will still provide the necessarily close fit at each end. Perhaps one disadvantage of this particular arrangement may be the need to pass the sleeve along the cable to be fitted with a smaller collared ferrule and in the correct orientation. Unless this is done in the correct way the securement between the sleeve and the ferrules will not be possible. This is not the case with the sleeve and collar arrangement previously described in which the sleeve can be used either way round.

The sleeve can also be formed with different diameter ends in order to accommodate different terminations on possiby different types of cables to be joined.

I claim:

1. A cable joint assembly for use between the ends of cables which each have an inner core including components which are to be connected together and a tensile element surrounding the core, the assembly comprising:
   a pair of anchor means, each being secured, in use, to the tensile element of a cable end, and
   a sleeve extending between cable ends,
   the connected core components being housed within the sleeve which is secured directly to the tensile elements of each cable end.

2. An assembly as in claim 1 in which at least part of the anchor means include a unitary portion of said sleeve.

3. An assembly as in claim 1 in which at least part of the anchor means are constituted by an end of the sleeve.

4. An assembly as in claim 1 in which the end of the sleeve is swaged into engagement with the tensile element.

5. An assembly as in claim 1 in which said anchor means comprise an insert received between the tensile element and the core at each cable end.

6. An assembly as in claim 1 in which the anchor means comprise a separate anchoring device connected to each cable.

7. An assembly as in claim 1 in which the sleeve is rigid.

8. An assembly as in claim 1 in which the sleeve is covered by a sealing sheath.

9. An assembly as in claim 8 in which the sealing sheath extends axially outwardly beyond the anchor means sealingly to engage the end of each cable.

10. A cable joint assembly for use between the ends of cables which each have an inner core including components which are to be connected together and a tensile element surrounding the core, the assembly comprising:
    a pair of anchor means, each secured, in use, to the tensile element of a cable end, and
    a sleeve extending between cable ends,
    the connected core components being housed within the sleeve which is secured directly to the tensile element,
    the sleeve being covered with a sealing sheath which extends axially outwardly beyond the anchor means sealingly to engage the end of each cable, and in which the sheath comprises a preformed member and an over moulding at each end sealing the member to each cable end.

11. An assembly as in claim 1 in which the core components comprise optical fibres.

12. A cable joint assembly for use between the ends of cables which each have an inner core including components which are to be connected together and a tensile element surrounding the core, the assembly comprising:
a pair of anchor means, each secured, in use, to the tensile element of a cable end, and
a sleeve extending between cable ends,
the connected core components being housed within the sleeve which is secured directly to the tensile element,
in which the sleeve is threadedly secured to the anchor means.

13. A cable joint assembly for use between the ends of cables which each have an inner core including components which are to be connected together and a tensile element surrounding the core, the assembly comprising:
a pair of anchor means, each secured, in use, to the tensile element of a cable end, and
a sleeve extending between cable ends,
the connected core components being housed within the sleeve which is secured directly to the tensile element,
in which one of the sleeve and anchor means is formed with a first abutment which co-operates with a second abutment on the other of the sleeve and anchor means to secure the sleeve to the anchor means by axial movement of the abutments past one another and relative angular movements thereof to engage the abutments.

14. A method of joining two cables having an inner core and associated core elements, said method comprising:
passing a joining sleeve along one cable;
terminating the ends of each of the cables in a respective anchor;
thereafter connecting the core elements of the cables; and
thereafter passing the sleeve back over a first termination and engaging the sleeve directly with both anchors to cover the connected core elements.

15. A method as in claim 14 in which the cable ends are mounted a prescribed distance apart in a jig.

16. A cable joint assembly for use between cables which each have an inner core, the joint assembly including a number of components, at least some of which are connected together, and tensile elements surrounding the cores, in use, the assembly comprising:

anchor means secured at the cable ends to the tensile elements and
a sleeve extending between cable ends,
the connected core components being housed within the sleeve,
the sleeve being secured directly to the tensile elements, and
the anchor means also having means for securing the inner cores.

17. An assembly as in claim 16 in which at least part of the anchor means are constituted by an end of the sleeve.

18. An assembly as in claim 17 in which each end of the sleeve is swaged into engagement with the respective tensile element.

19. An assembly as in claim 16 in which the anchor means comprise inserts received between the tensile elements and the cores.

20. An assembly as in claim 16 in which the anchor means comprise a separate anchoring device connected to each cable.

21. An assembly as in claim 16 in which the sleeve is rigid.

22. An assembly as in claim 16 in which the sleeve is covered by a sealing sheath.

23. An assembly as in claim 22 in which the sealing sheath extends axially beyond the anchor means sealingly to engage the end of each cable.

24. An assembly as in claim 16 in which the sheath comprises a preformed member and an over moulding at each end sealing the member to each cable end.

25. An assembly as in claim 16 in which the core components comprise optical fibres.

26. An assembly as in claim 16 in which the sleeve is threadedly secured to the anchor means.

27. An assembly as in claim 16 in which one of the sleeve and anchor means is formed with a first abutment which co-operates with a second abutment on the other of the sleeve and anchor means to secure the sleeve to the anchor means by axial movement of the abutments past one another and relative angular movements thereof to engage the abutments.

28. A method of joining two cables, each having an inner core and core elements, said method comprising:
passing the joining sleeve along one cable;
terminating the ends of the cables in respectively associated anchor;
securing the inner cores of each cable to its anchor;
interconnecting the core elements; and
passing the sleeve back over the terminations of the ends of the cables in the anchors and engaging the sleeve directly with both tensile elements to cover the connected core elements.

29. A method as in claim 28 in which the cable ends are mounted a prescribed distance apart in a jig.

* * * * *